United States Patent
Johnson et al.

(10) Patent No.: US 8,591,844 B1
(45) Date of Patent: Nov. 26, 2013

(54) START UP CATALYST HEATING

(75) Inventors: Dennis W. Johnson, Simpsonville, SC (US); James H. Brown, Simpsonville, SC (US); Jon Peeples, Taylors, SC (US)

(73) Assignee: Fluor Technologies Corporation, Aliso Viejo, CA (US)

( * ) Notice: Subject to any disclaimer, the term of this patent is extended or adjusted under 35 U.S.C. 154(b) by 0 days.

(21) Appl. No.: 13/474,462

(22) Filed: May 17, 2012

(51) Int. Cl.
*B01D 53/34* (2006.01)
*B01D 53/56* (2006.01)
*B01D 53/74* (2006.01)
*B01D 53/86* (2006.01)

(52) U.S. Cl.
USPC ............... 423/210; 423/239.1; 423/DIG. 6; 422/168; 422/173

(58) Field of Classification Search
USPC ........... 423/210, 239.1, DIG. 6; 422/168, 173
See application file for complete search history.

(56) References Cited

U.S. PATENT DOCUMENTS

| | | | | |
|---|---|---|---|---|
| 3,690,840 A | * | 9/1972 | Volker | 422/171 |
| 4,444,735 A | * | 4/1984 | Birmingham et al. | 423/210 |
| 5,589,142 A | * | 12/1996 | Gribbon | 422/171 |
| 5,753,197 A | * | 5/1998 | Chen et al. | 423/210 |
| 6,669,463 B2 | | 12/2003 | Beutel et al. | |
| 6,767,518 B2 | | 7/2004 | Ichikawa et al. | |
| 2001/0047620 A1 | | 12/2001 | Ichikawa et al. | |
| 2003/0134239 A1 | | 7/2003 | Beutel et al. | |
| 2006/0286010 A1 | * | 12/2006 | Brasseur | 422/168 |
| 2009/0223861 A1 | | 9/2009 | Sugiura et al. | |
| 2012/0048158 A1 | * | 3/2012 | Grace et al. | 110/203 |
| 2012/0183463 A1 | * | 7/2012 | Lisberger | 423/239.1 |

FOREIGN PATENT DOCUMENTS

| | | |
|---|---|---|
| DE | 60215086 T2 | 1/2007 |
| JP | 62-254827 A * | 11/1987 |
| JP | 2001348206 A | 12/2001 |

\* cited by examiner

*Primary Examiner* — Timothy Vanoy
(74) *Attorney, Agent, or Firm* — Fish & Associates, PC

(57) ABSTRACT

Systems and methods are described for reducing the start-up time of flue gas conditioning processes. Such processes can include a gas removal unit configured to selectively remove a reactive gas from a flue gas stream using a catalyst and reagent to produce a scrubbed stream that is substantially depleted of the reactive gas. A heating device can advantageously be used upstream of the gas removal unit to thereby preheat the catalyst to an operational temperature and thereby reduce the start-up time of the process.

20 Claims, 6 Drawing Sheets

START UP CATALYST HEATING

FIELD OF THE INVENTION

The field of the invention is flue gas conditioning.

BACKGROUND

In selective catalytic reactors (SCRs), a catalyst is utilized to remove $NO_x$ from combustion gases. Because the catalyst is most effective in a temperature range of about 315-425° C., during start-up of a SCR the catalyst is cold and can require as much as 12 hours or more for the plant to reach the required temperature before ammonia can be injected. In addition, new regulations have placed additional pressure on owners of SCRs to reduce plant emissions to low levels even during start up periods.

A schematic of a portion of a typical coal-filed power plant 100 is shown in FIG. 1, which lacks any control over the temperature of the catalyst and thus the catalyst's temperature is dependent on the firing and heat absorption conditions in the furnace 102, superheaters, and economizer regions 106 in the boiler 108. For these reasons, ammonia 110 is generally not injected into the SCR 112 until the catalyst in the SCR 112 reaches a temperature of at least 250-315° F. Below this temperature, reactions generally will not occur and the ammonia would be wasted and would pass through to the atmosphere.

Although it is known to preheat oxidizing catalysts for fuel reforming, such as that described in U.S. pat. publ. no. 2001/0047620 to Ichikawa et al. (publ. December 2001) and U.S. pat. publ. no. 2009/0223861 to Sugiura et al. (publ. September 2009), such processes are specific to fuel reforming rather than reducing catalysts for use in selectively removing reactive gases from a combustion flue gas. Ichikawa and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Thus, there is still a need for systems and methods for reducing the start-up time in a flue gas conditioning process.

SUMMARY OF THE INVENTION

The inventive subject matter provides apparatus, systems and methods in which one can reduce the start-up time of flue gas conditioning processes. In an exemplary embodiment, a flue gas conditioning system can include a gas removal unit configured to (a) receive a flue gas stream and a reagent and (b) selectively remove a reactive gas from the flue gas stream using a catalyst and the reagent. In this manner, a scrubbed stream can be produced from the flue gas stream that is substantially depleted of the reactive gas.

To reduce start-up time of the gas removal unit, the system can advantageously include a heating device fluidly coupled to the gas removal unit that preheats the flue gas upstream of the gas removal unit and thereby preheats the catalyst.

Methods for reducing the start-up time of a flue gas conditioning process are also contemplated, which include preheating a catalyst upstream of a gas removal unit using a heating device when the catalyst has a temperature of less than approximately 300° C., and more preferably, less than 250° C. A gas removal unit can receive at least a portion of the preheated flue gas stream used to heat the catalyst, and produce a product stream from the flue gas stream that is substantially depleted of a reactive gas.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including significantly reducing the start-up time of flue gas conditioning processes.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
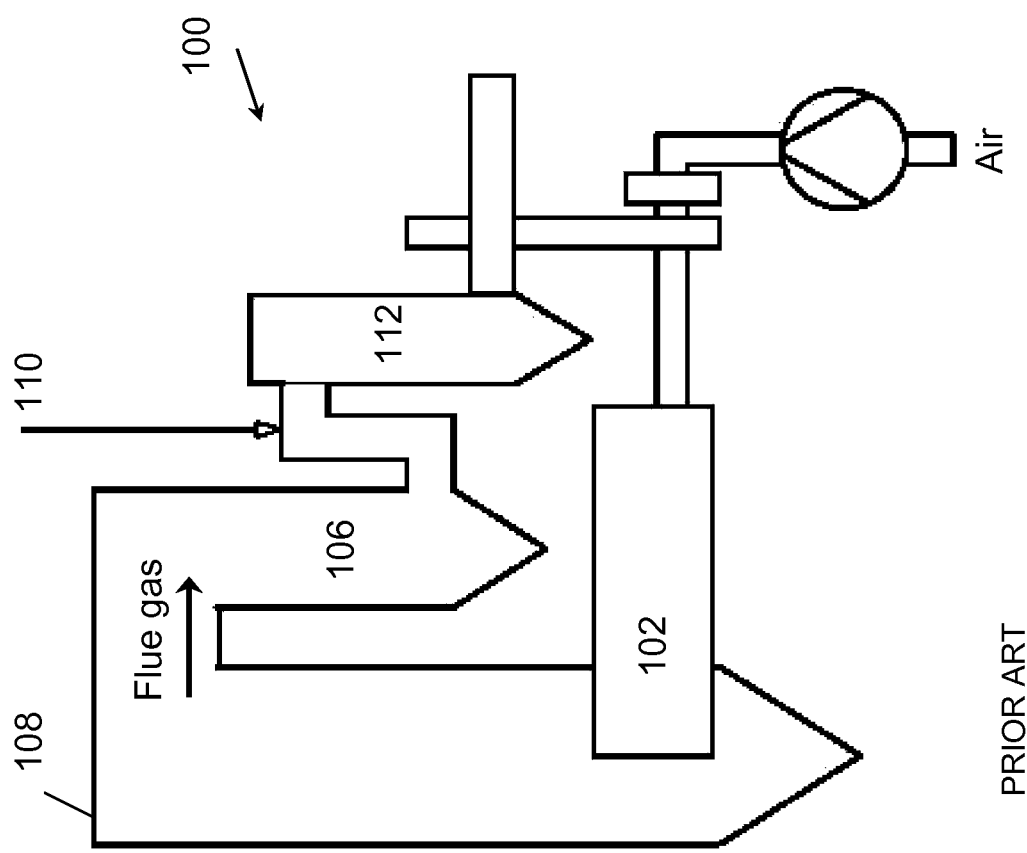
FIG. 1 is a schematic of a portion of a typical coal-filed power plant.
Figure 2:
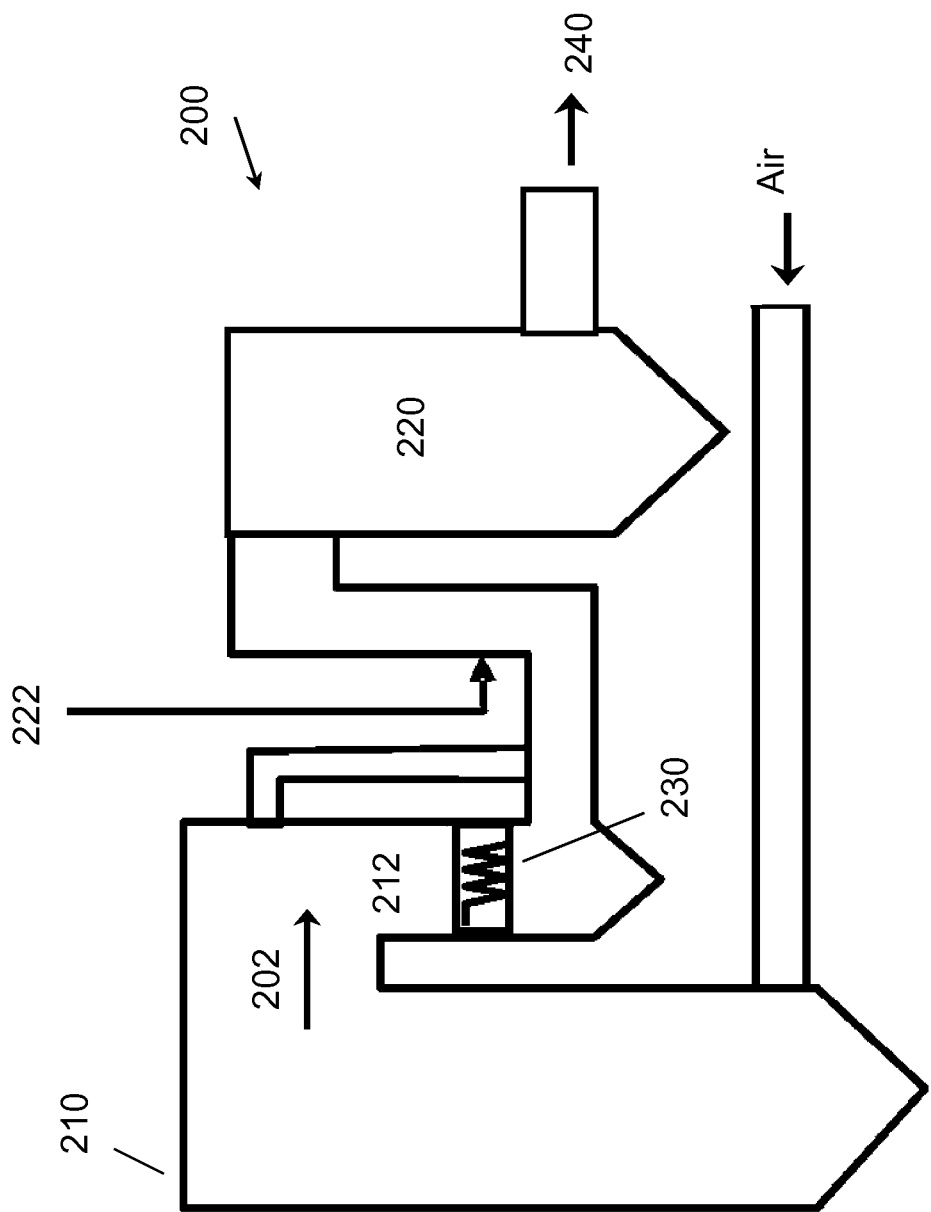
FIG. 2 is a schematic of one embodiment of a flue gas conditioning system having at least one heating device fluidly coupled to a gas removal unit.

In FIG. 2, a flue gas conditioning system 200 is shown having a gas removal unit 220, which is preferably configured to receive at least a portion of a flue gas stream 202 and a reagent 222 and (b) selectively remove a reactive gas from the portion of the flue gas stream 202 using a catalyst and the reagent 222 to produce a scrubbed stream 240 substantially depleted of the reactive gas. As used herein, the term "substantially depleted" means less than 10 vol % of the reactive gas. In especially preferred embodiments, the scrubbed stream 240 comprises less than 5 vol % of the reactive gas, and even more preferably, less than 1 vol % of the reactive gas.

In especially preferred embodiments, the gas removal unit 220 comprises a SCR configured to selectively remove $NO_x$ from the flue gas stream 202 using a $NO_x$ reducing catalyst and ammonia as the reagent, although the specific catalyst and reagent will depend upon the type of gas removal unit, the reactive gas to be removed and the composition of the flue gas stream. For example, contemplated systems could alternatively be configured to selectively remove NO, CO, $SO_x$, or other reactive gasses.

To preheat the catalyst and thereby decrease the required start-up time of the gas removal unit 220, system 200 can advantageously include at least one heating device 230 fluidly coupled to the gas removal unit 220. Heating device 230 is preferably configured to preheat the catalyst upstream of the gas removal unit 220.

Heating device 230 preferably comprises a heat exchanger configured to preheat the catalyst via heat exchange contact of at least a portion of the flue gas stream 202 with a heated fluid such as steam. In such embodiments, it is especially preferred that the steam is heated via heat exchange contact with the scrubbed stream 240 or other fluids downstream of the gas removal unit 220. Alternatively, the steam could be from an extraction point on the boiler/turbine steam circuit. By heating the flue gas stream using a steam heat exchanger, excess heat within system 200 can advantageously be utilized, which thereby reduces the cost of preheating the catalyst by eliminating or reducing the need for external boilers.

In other contemplated embodiments, steam can be fed into an economizer region 212 of boiler 210 during start up. In such embodiments, one or more valves could be used to stop water flow within the economizer region 212 and begin steam flow. The steam, preferably saturated steam, can be used to heat the flue gas, and the resulting condensate can be directed to an appropriate location for reuse within system 200. Such process could advantageously be automated such that steam flows into the economizer region 212 when a temperature of the catalyst is below a predetermined threshold, for example, 300° C.

Although shown disposed within the economizer region 212 of boiler 210, it is contemplated that the heating device 230 could be located at any point between the economizer region 212 and an inlet to the gas removal unit 220. Still further, it is contemplated that the heating device could be external to system 200, and heated air or other fluid can be fed to system 200 via a fan, pump, or other device.

Although heating device is shown as a heat exchanger, any commercially suitable heating mechanism could be used, which is configured to withstand the acidic properties of the flue gas and allow for preheating of the catalyst without risk of damage to components of flue gas conditioning system 200.

Figure 3:
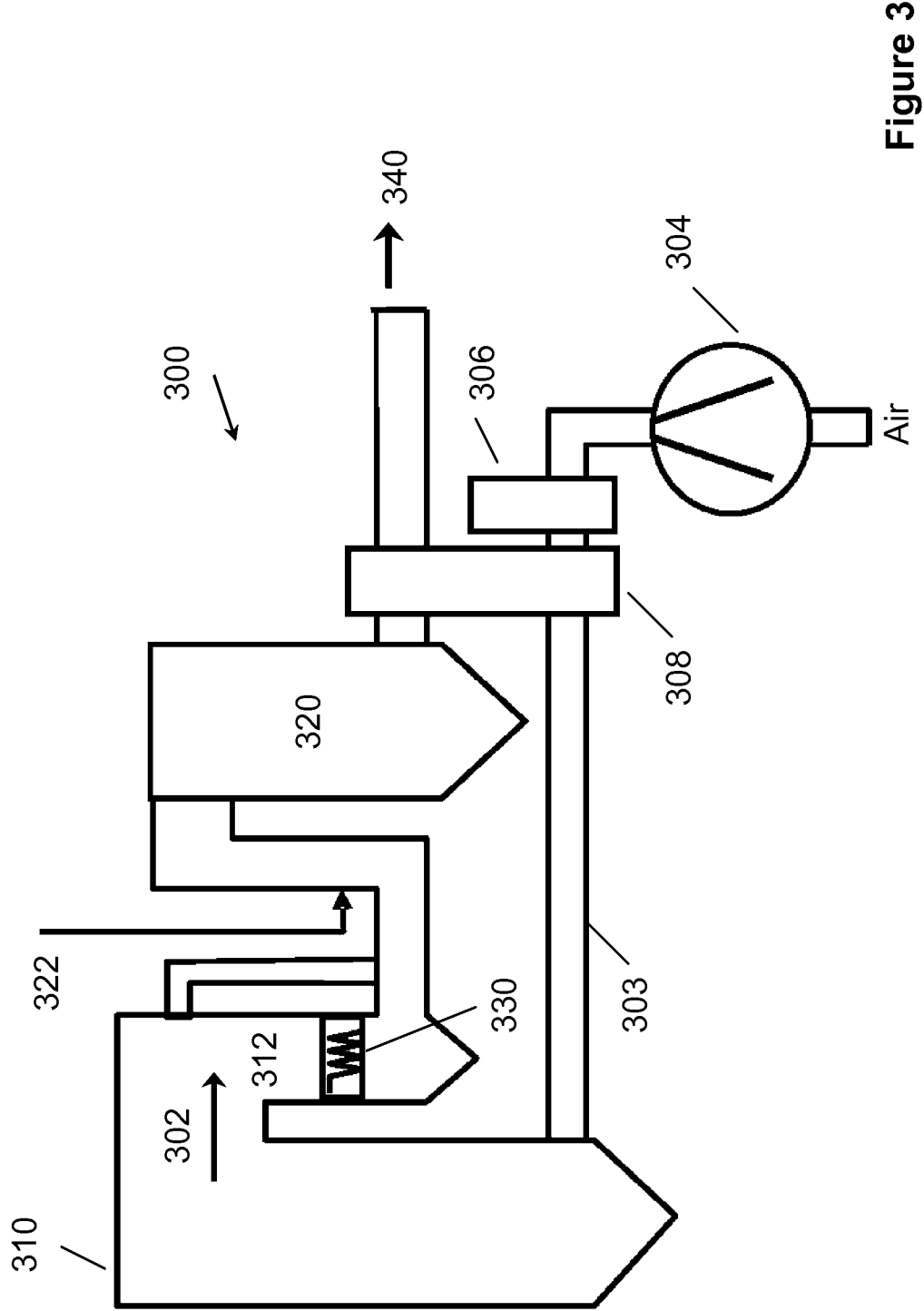
FIG. 3 is a schematic of one embodiment of a flue gas conditioning system having an air intake conduit with a forced draft fan and air preheater.

FIG. 3 illustrates another embodiment of a flue gas conditioning system 300 with an air intake conduit 303 having a forced draft fan 304 that directs air past steam air heater 306 and air pre-heater 308, which collectively heat the air upstream of the boiler 310. Air pre-heater advantageously heats the air via heat exchange contact with scrubbed stream 340, which thereby reduces the need for external heating circuits. With respect to the remaining numerals in FIG. 3, the same considerations for like components with like numerals of FIG. 2 apply.

Figure 4:
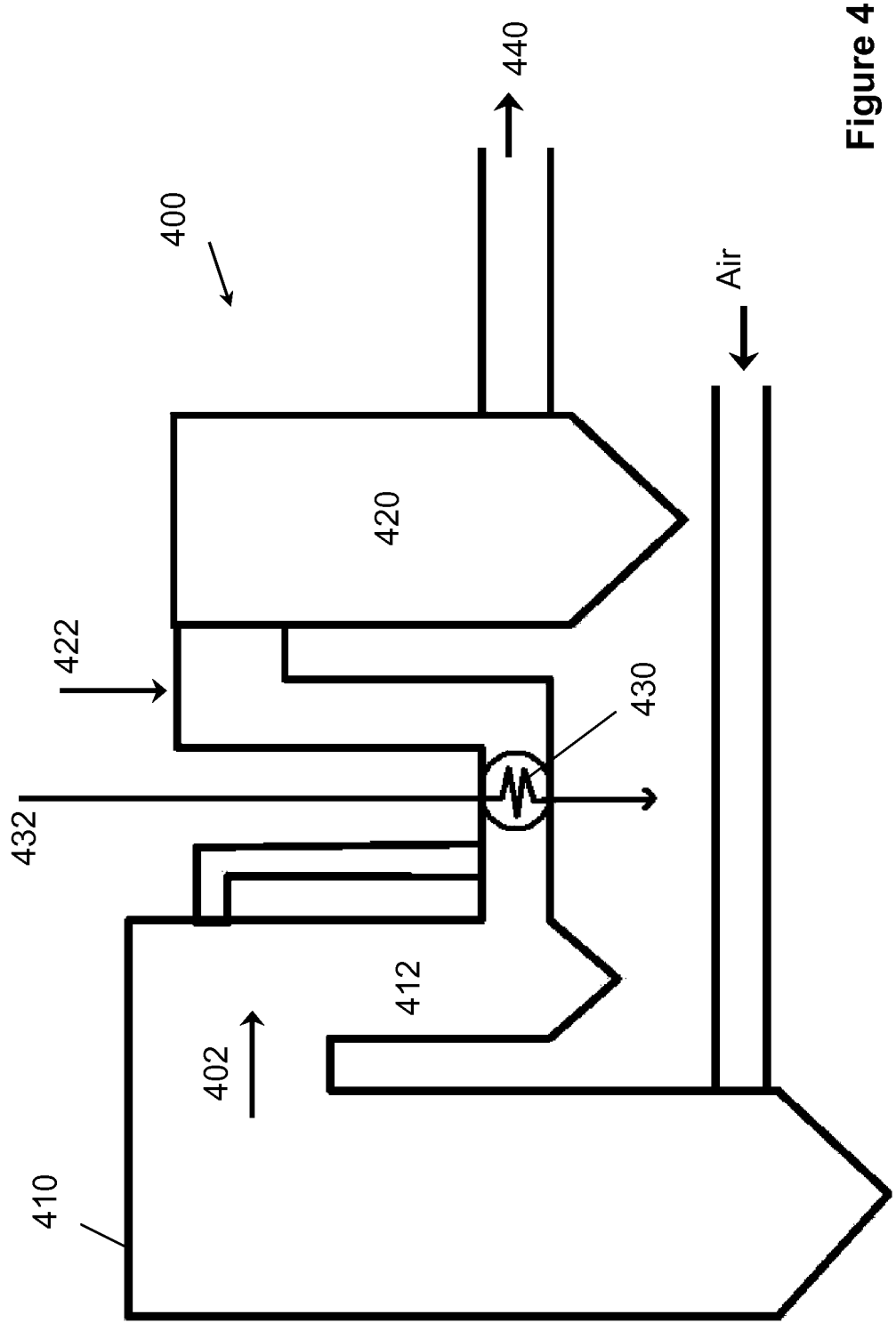
FIG. 4 is a schematic of one embodiment of a flue gas conditioning system configured to heat at least a portion of a flue gas stream by heat exchange contact with a heated fluid time.

In FIG. 4, yet another embodiment of a flue gas conditioning system 400 is shown in which at least a portion of the flue gas stream 402 can be heated via heat exchanger 430. Heat exchanger 430 can be configured to allow heat exchange contact between the portion of the flue gas stream 402 and a heat exchange fluid 432. Heat exchange fluid preferably comprises steam, although any commercially suitable fluid could be used. It is especially preferred that the steam is generated as part of a heat exchange circuit, such that the condensed water can be reheated and reused within system 200.

Figure 5:
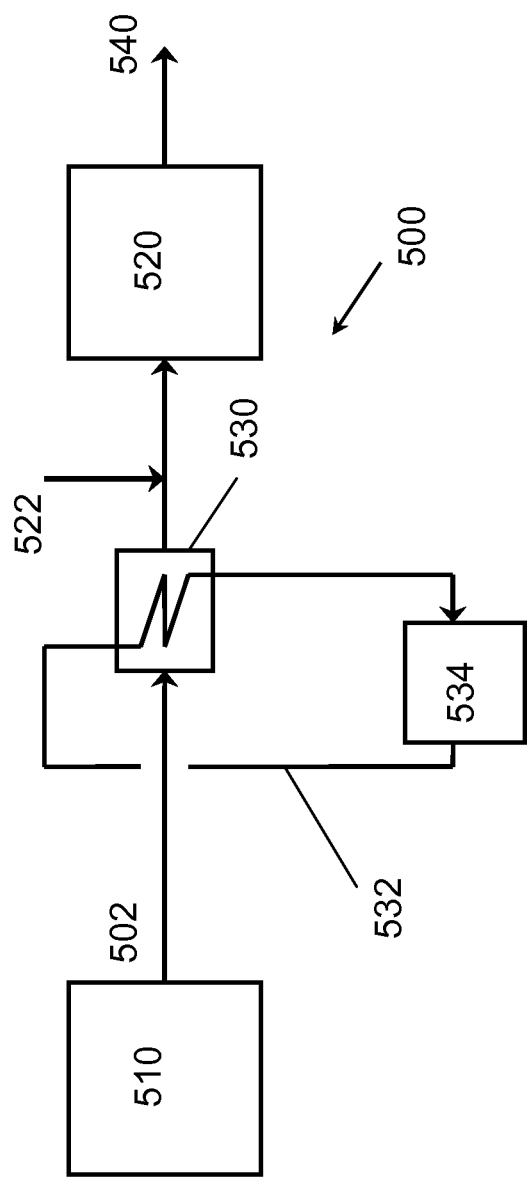
FIG. 5 is a schematic of one embodiment of a flue gas conditioning system having a heat exchanger disposed between a boiler and a gas removal unit.

FIG. 5 illustrates another embodiment of a flue gas conditioning system 500 having a heat exchanger 530 disposed between the boiler 510 and gas removal unit 520. Heat exchanger 530 can advantageously be configured to heat at least a portion of flue gas stream 502 via heat exchange contact with a heated fluid. Preferably, the heated fluid is disposed within a heat exchange circuit 532 comprising boiler 534, such that the heated fluid can be reheated via boiler 534 and reused within circuit 532.

Figure 6:
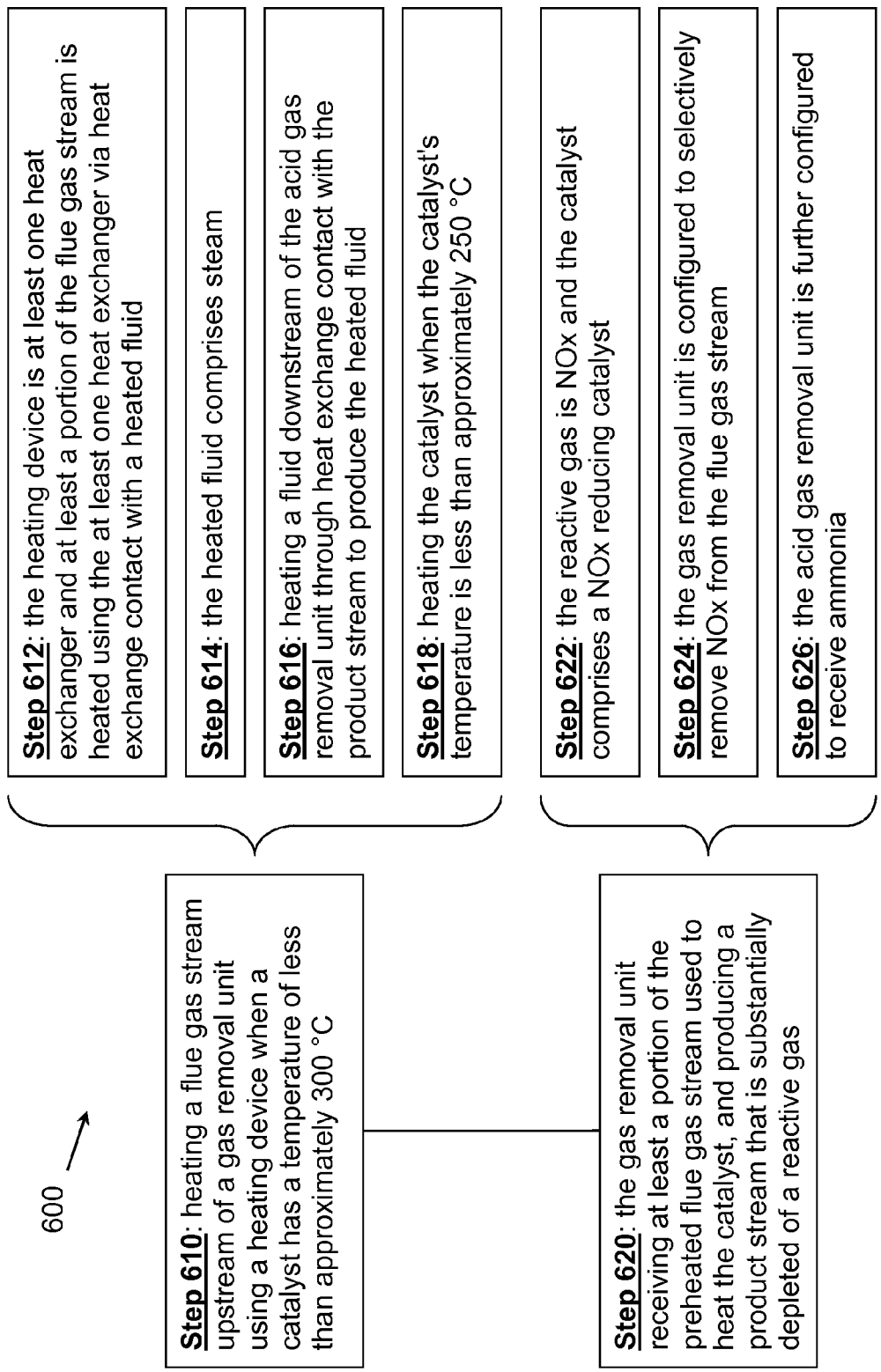
FIG. 6 is a flowchart of one embodiment of a method for reducing a start-up time of a flue gas conditioning process.

In FIG. 6, one embodiment of a method 600 is shown for reducing a start-up time of a flue gas conditioning process. In step 610, a catalyst can be heated upstream of a gas removal unit using a heating device when the catalyst's temperature is less than approximately 300° C., and more preferably less than 250° C. in step 618. Of course, the specific temperature can vary depending on the type of catalyst.

The gas removal unit can receive at least a portion of the preheated flue gas stream used to heat the catalyst, and produce a product stream substantially depleted of a reactive gas in step 620.

In especially preferred embodiments shown in step 622, the reactive gas comprises $NO_x$ and the catalyst comprises a $NO_x$ reducing catalyst. In such embodiments, the gas removal unit can be configured to selectively remove $NO_x$ from the flue gas stream in step 624 and produce a product stream that is substantially depleted of $NO_x$. In step 626, the acid gas removal unit can be further configured to receive ammonia.

In step 612, the heating device is at least one heat exchanger, and at least a portion of the catalyst can be heated using the at least one heat exchanger via heat exchange contact with a heated fluid. The heated fluid preferably comprises steam in step 514, although any commercially suitable heat exchange media can be used.

It is contemplated in step 616 that a fluid can be heated downstream of the acid gas removal unit through heat exchange contact with the product stream to produce the heated fluid. In this manner, the efficiency of the process can advantageously be increased by utilizing excess heat from one or more downstream product streams of the flue gas conditioning process.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A flue gas conditioning system having a reduced start-up time, comprising:
 a heating device configured to preheat a flue gas stream upstream of a gas removal unit;

wherein the gas removal unit comprises a catalyst and is fluidly coupled to the heating device, and wherein the gas removal unit is configured to (a) receive the preheated flue gas stream, and (b) allow for heat exchange between the preheated flue gas stream and the catalyst such that the catalyst in preheated;

wherein the gas removal unit is further configured to (a) receive a reagent and (b) selectively remove a reactive gas from the flue gas stream using the preheated catalyst and the reagent to produce a scrubbed stream that is substantially depleted of the reactive gas; and wherein the heating device is configured to operate when a temperature of the catalyst is less than approximately 300° C.

2. The system of claim 1, wherein the reactive gas comprises $NO_x$.

3. The system of claim 1, wherein the heating device comprises a heat exchanger configured to heat the flue gas stream via heat exchange contact with a heated fluid.

4. The system of claim 3, wherein the heated fluid comprises steam.

5. The system of claim 1, wherein the heating device comprises a fan configured to cause heated fluid to contact the flue gas stream upstream of the gas removal unit.

6. The system of claim 5, wherein the heating device further comprises an economizer fluidly coupled with the fan, and configured to (a) receive the flue gas stream and the heated fluid, and (b) preheat the flue gas stream via heat exchange contact with the heated fluid.

7. The system of claim 5, wherein the heating device further comprises an air pre-heater configured to heat air through heat exchange contact with at least a portion of the scrubbed stream to produce the heated fluid.

8. The system of claim 1, wherein the gas removal unit comprises a selective catalytic reactor.

9. The system of claim 1, wherein the heating device is configured to operate when a temperature of the catalyst is less than approximately 250° C.

10. The system of claim 1, wherein the preheated flue gas and reagent are combined upstream of the gas removal unit.

11. The method for reducing a start-up time of a flue gas conditioning process, comprising:

heating a flue gas stream upstream of a gas removal unit using a heating device when a catalyst within the gas removal unit has a temperature of less than approximately 300° C.; and the gas removal unit receiving at least a portion of the preheated flue gas stream used to heat the catalyst, and producing a product stream that is substantially depleted of a reactive gas.

12. The method of claim 11, wherein the reactive gas is $NO_x$ and the catalyst comprises a $NO_x$ reducing catalyst.

13. The method of claim 11, wherein the gas removal unit is configured to selectively remove $NO_x$ from the flue gas stream.

14. The method of claim 11, wherein the heating device comprises at least one heat exchanger and wherein the step of heating the flue gas stream comprises heating at least a portion of the flue gas stream using the at least one heat exchanger via heat exchange contact with a heated fluid.

15. The method of claim 14, wherein the heated fluid comprises steam.

16. The method of claim 14, further comprising heating a fluid downstream of the acid gas removal unit through heat exchange contact with the product stream to produce the heated fluid.

17. The method of claim 11, further comprising heating the catalyst when a temperature of the catalyst is less than approximately 250° C.

18. A flue gas conditioning system having a reduced start-up time, comprising:

a gas removal unit containing a catalyst;

a heating device comprising a heat exchanger configured to receive steam and preheat a flue gas stream upstream of the gas removal unit via heat exchange between the flue gas stream and the steam;

wherein the gas removal unit is configured to receive the preheated flue gas stream and allow heat exchange between at least a portion of the preheated flue gas stream and the catalyst such that the catalyst is preheated to an operating temperature; and wherein the gas removal unit is further configured to (a) receive a reagent and (b) selectively remove a reactive gas from the flue gas stream using the preheated catalyst and the reagent to produce a scrubbed stream that is substantially depleted of the reactive gas.

19. The system of claim 18, wherein the heating device further comprises an economizer fluidly coupled with a fan, and configured to (a) receive the flue gas stream and the steam, and (b) preheat the flue gas stream via heat exchange contact with the steam.

20. The system of claim 18, wherein the gas removal unit comprises a selective catalytic reactor.

* * * * *